United States Patent
Ackerman et al.

[19]

[11] Patent Number: 5,867,568
[45] Date of Patent: Feb. 2, 1999

[54] COVERAGE OF REDIRECTED CALLS

[75] Inventors: Anthony T. Ackerman, Colts Neck, N.J.; Richard K. Lee, Westminster, Colo.; Rickie Eugene Meis, Arvada, Colo.; Barry E. Weiss, Boulder, Colo.

[73] Assignee: Lucent Technologies Inc., Murray Hill, N.J.

[21] Appl. No.: 748,034

[22] Filed: Nov. 12, 1996

Related U.S. Application Data

[60] Provisional application No. 60/024,649 Aug. 22, 1996.
[51] Int. Cl.⁶ .......................... H04M 3/42; H04M 7/00; H04M 3/00
[52] U.S. Cl. ..................... 379/201; 379/211; 379/221; 379/225; 379/178
[58] Field of Search .................... 379/211, 210, 379/212, 201, 207, 221, 225, 231, 232, 220, 196, 198

[56] References Cited

U.S. PATENT DOCUMENTS

| | | | |
|---|---|---|---|
| 4,150,257 | 4/1979 | Fenton et al. | 379/211 |
| 4,926,462 | 5/1990 | Ladd et al. | 379/212 |
| 5,313,459 | 5/1994 | Matern | 379/201 |
| 5,369,695 | 11/1994 | Chakravarti et al. | 379/211 |
| 5,416,834 | 5/1995 | Bales et al. | 379/211 |
| 5,521,970 | 5/1996 | Herrick et al. | 379/201 |

*Primary Examiner*—Krista Zele
*Assistant Examiner*—Benny Q. Tieu

[57] ABSTRACT

Calls redirected off-net, which includes call forwarding and call coverage, is provided at the switch to which the call is initially directed (the principal party's switch), by monitoring the redirected off-net connection with a call classifier and listening for the appearance of ringback tone and the appearance of voice frequency energy. The call is allowed to be completed to the off-net covering end-point if voice frequency energy is detected before ringback tone appears or if voice frequency energy appears within a predetermined time-out interval. If ringback tone continues beyond a time-out interval, if voice-frequency energy is not detected within the time-out interval, or if a call progress tone other than ringback is detected, further processing of the call is continued at the principal party's switch to determine if another covering point is listed. If no other coverage point is listed, monitoring of the call continues until the calling party hangs up. A simulated bridged appearance is maintained at the originating switch to allow the call to be picked up at the covered station at any time.

8 Claims, 7 Drawing Sheets

FIG. 5 the invocation of call redirection for a call, that the covering end-point is served by a remote switch and extending the call to the remote switch serving the call-covering end-point;
COVERAGE OF REDIRECTED CALLS This application claims the benefit of U.S. Provisional Application No. 60/024,649, filed Aug. 22, 1996.

TECHNICAL FILED

This invention relates to call redirection and, more specifically, to the control of calls forwarded to a covering end-point beyond the direct reach of the first switch to which the call was initially directed, e.g., a call forwarded over the public telecommunications network.

BACKGROUND OF THE INVENTION

Call redirection, which includes call forwarding and call coverage from one endpoint to another, is a common feature of many telecommunications switches, particularly private branch exchanges (PBXs). An illustrative implementation of a call coverage feature is described in U.S. Pat. No. 4,436,962. Over time, efforts have been made to extend features across entire networks of routing nodes (e.g., switches) to make features that work with intra-node calls also work with inter-node calls. This is illustrated, for example, in U.S. Pat. No. 4,488,004. The call coverage feature has been a specific focus of some of these efforts, as illustrated by U.S. Pat. Nos. 5,313,459 and 5,369,695, for example.

Call redirection typically provides a covered end-point with the option of specifying a sequence of alternative end-points (also called covering end-points) to which the call may be directed if it cannot successfully be completed to the first or any subsequent covering end-point in the list of covering end-points stored in memory, i.e., the coverage path. However, when the coverage path specifies a covering end-point that is served by another switch, such as an end-point reached by using the public switched network, the switch to which the call was initially directed (hereinafter, the principal's switch), normally relinquishes control of the call to the other switch. Therefore, if the principal's switch redirects a call for coverage to a covering remote end-point but the end-point is unable to accept the call, the principal's switch is not able to regain control of the call and redirect it to the next covering end-point specified in the coverage path. This is especially true when the covering switch is in the public telecommunications network or when the switches do not have a cooperating protocol in place.

Heretofore it has been appreciated that if there is a common channel signaling network linking the switches it may be employed to allow the subsequent covering switch to inform the previous (e.g., covered) switch whether or not the call can be completed and, if not, the first switch may resume call coverage.

Another approach is disclosed in the copending application of D. W. Herrick et al, U.S. Pat. No. 5,521,970 in which the switch originally handling the call determines whether the covering switch to which the call would be redirected is a "cooperating switch", i.e., one which has been configured to effect network call coverage like the original switch and with which it can exchange signaling control information, sometimes hereinafter referred to as "DCS". If the covering switch is not a "cooperating" switch, the first switch relinquishes control to the covering switch. If the covering switch is a "cooperating" switch, the first switch sends a data message to the covering switch identifying the call as a network coverage call, the second switch determines whether it has a call-covering end-point available to receive the call, signals that fact to the first switch and simultaneously rings the call-covering end-point. If the call covering end-point was not available at the end-point, the first switch resumes control of the call.

While the ability to immediately complete the call to the covering end-point in the above-identified Herrick et al patent avoided the problem of the covering end-point becoming unavailable, it would be extremely advantageous if call coverage could be performed "off-net", i.e., when the call covering end-point is located beyond the direct reach of the first switch to which the call was initially directed, without requiring a signaling channel between the two switches handling the call. In addition, it would be helpful if a call could be extended using any type of available voice-frequency or ISDN type trunk path linking the switches.

SUMMARY OF THE INVENTION

A method of providing for continued redirection of telephone calls when the call covering end-point is located beyond the direct reach of the first switch serving the principal terminal to which the call was initially directed (i.e., an off-net call), comprising the steps of:

(a) determining at the principal's switch, in response to the invocation of call redirection for a call, that the covering end-point is served by a remote switch and extending the call to the remote switch serving the call-covering end-point;

(b) determining at the principal's switch whether ringback tone is followed by the appearance of voice frequency energy within a predetermined time interval; and (c) completing the call to the call-covering remote end-point when voice frequency energy appears within said predetermined time interval and further processing the call at the first switch when said voice frequency energy fails to appear within said predetermined time interval. Advantageously, a simulated bridged appearance is maintained at the principal's switch so the principal may answer the redirected call by activating a call appearance button at his terminal.

BRIEF DESCRIPTION OF THE DRAWING

The foregoing and other advantages and features of the invention will become more apparent from the following description of an illustrative embodiment of the invention taken together with the drawing in which.

DETAILED DESCRIPTION

Figure 1:
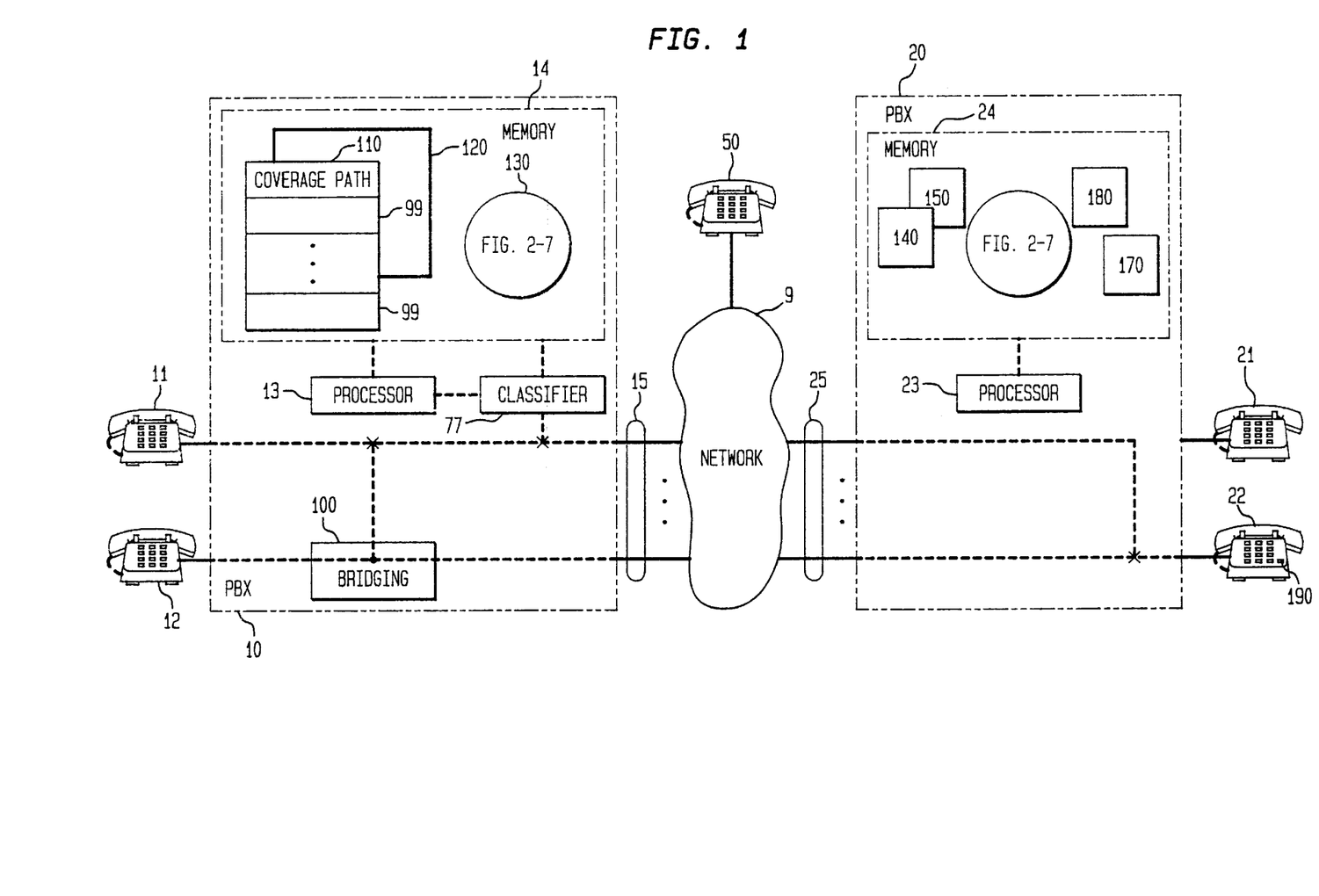
FIG. 1 is a block diagram of an example of a telecommunications network that includes an illustrative embodiment of the invention.

FIG. 1 shows a telecommunications network illustratively including private ranch exchanges (PBXs) 10 and 20, such as the Lucent Technologies, Inc., G3 PBXs interconnected by a network 9 which, illustratively, may include a public communications network having central office switches, a hybrid network, a data network, or any other telecommunications network that comprises a plurality of nodes that can terminate the call at any remote end-point. Illustratively, a POTS telephone 50 is one form of such an end-point.

As shown in FIG. 1, each PBX 10 and 20 serves its own complement of telephone set terminals or communications end-points, 11–12 and 21–22, respectively. Each PBX 10 and 20 is connected to network 9 by a plurality of user communications links 15 and 25 which may be telephony trunks or ISDN bearer channels. Each PBX 10, 20 includes a processor 13, 23 which controls the operation of the PBX 10, 20, and a memory 14, 24 which stores control programs and data for use by processor 13, 23.

Included among the control data stored in memory 14, 24 is information detailing the coverage paths 110–120, 140–150 respective to one of the terminals 11–12, 21–22. Each coverage path includes a sequence of entries 99, each of which identifies a different end-point or terminal to which incoming calls destined for the associated end-point or terminal may be redirected. Included among the control programs stored in each of the memories 14 and 24 are call redirection functions 130. Except for the functions 130, the telecommunications network shown in FIG. 1 is conventional. Hence, only the functions 130 will be described in any detail.

The operations carried out by PBXs 10 and 20 under control of functions 130 are diagrammed in FIGS. 2–7. For purposes of illustration, assume that PBX 10 has received an incoming call for a terminal such as terminal 11 which has call redirection activated. Terminal 11 is sometimes referred to herein as the principal or principal's terminal and, accordingly, switch 10 may be referred to as the principal's switch. If the call cannot be completed to or is not answered by terminal 11, call redirection for the call is invoked by PBX 10 at step 200 to determine where this call should be redirected. Redirection will be dictated by coverage path 110 that is associated covered terminal 11. PBX 10 accesses the first entry 99 in that coverage path 110 to determine the end-point—the covering terminal to which the call should be redirected, at step 202.

Figure 2:
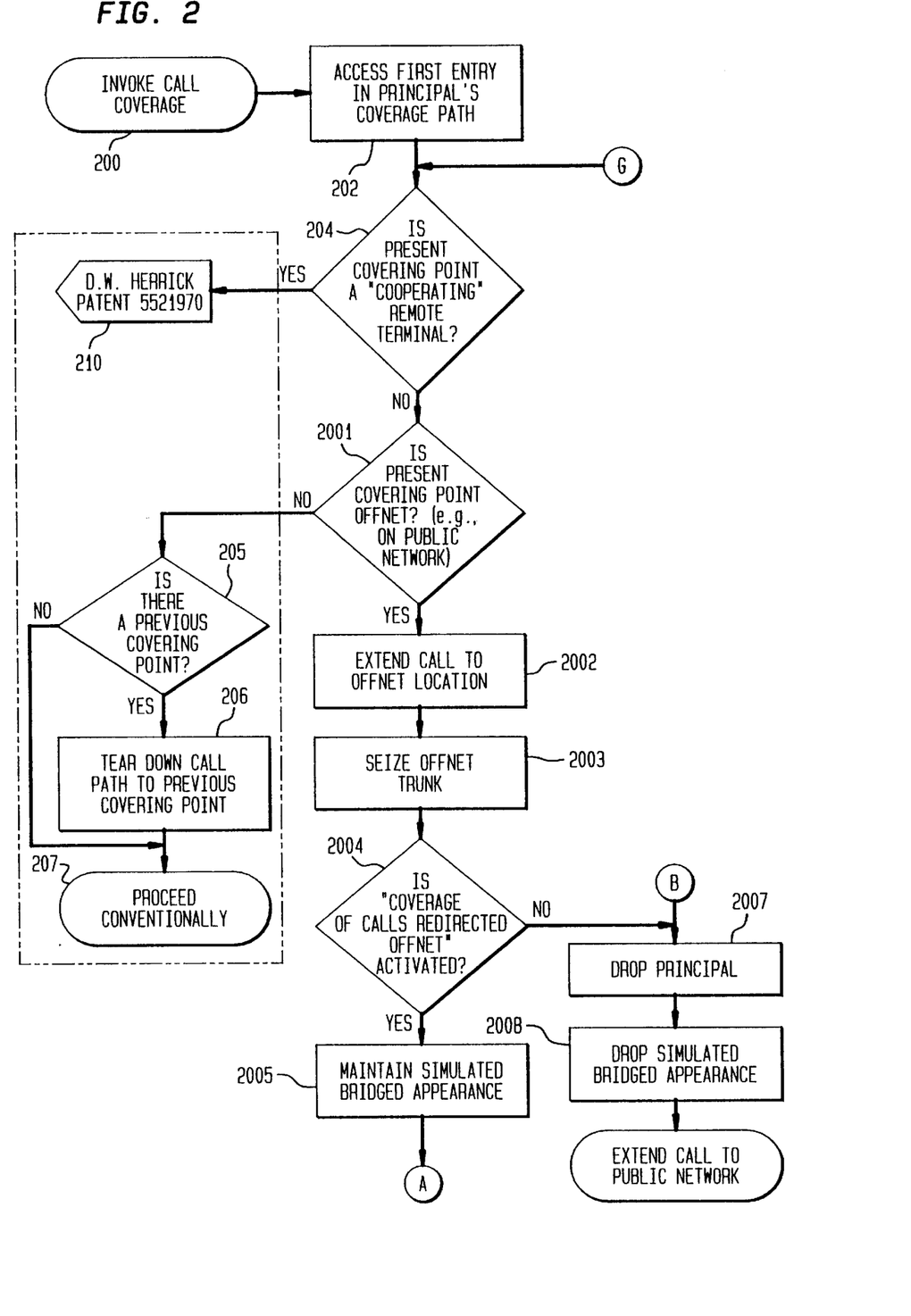
FIGS. 2–7 are a flow diagram of a network call redirection procedure of the invention.

At step 204 PBX 10 determines whether the covering terminal is a remote terminal served by a "cooperating" switch i.e., one that has been configured to effect network call redirection and with which it can exchange data messages concerning the existence of a network coverage call and the availability of a call covering end-point, as described in the above-mentioned D. W. Herrick et al patent. If so, the call may be routed to the remote terminal as therein described.

If PBX 10 determines at step 204 that the covering terminal is a terminal that is not served by a "cooperating" switch—PBX 20 in this illustrative example—PBX 10 at step 2001 proceeds to determine whether the covering switch is an "off-net" switch, e.g., part of the public switched network. If the covering point is not "off-net" it may be handled conventionally. Briefly, as described in the Herrick, et al patent at steps 205 through 207, a check is made at step 205 to determine if there was a previous covering end-point for the call. If so, the previous connection is taken down at step 206 and the call is completed conventionally.

If PBX 10 determines at step 2001 that the covering terminal is a remote terminal that is "off-net" it may be reachable by any type of voice frequency or ISDN trunk and with no requirement for the exchange of data messages between the switches, then, in step 2002, the call is extended to the remote location by seizing, in step 2003, an off-net trunk. In step 2004, a determination is made whether the "redirection of calls off-net" feature is activated in memory 14 of switch 10. If so, a simulated bridged appearance is maintained at step 2005 so that the principal station 11 may pick up the call at any time, and processing continues at entry point "A".

If redirection of off-net calls is not activated, then the connection to the principal station is dropped at step 2007, the simulated bridged appearance is dropped at step 2008 and the call is extended to the covering terminal over the public switched network in the conventional manner, at step 2009, i.e., control over the call is lost.

Figure 3:
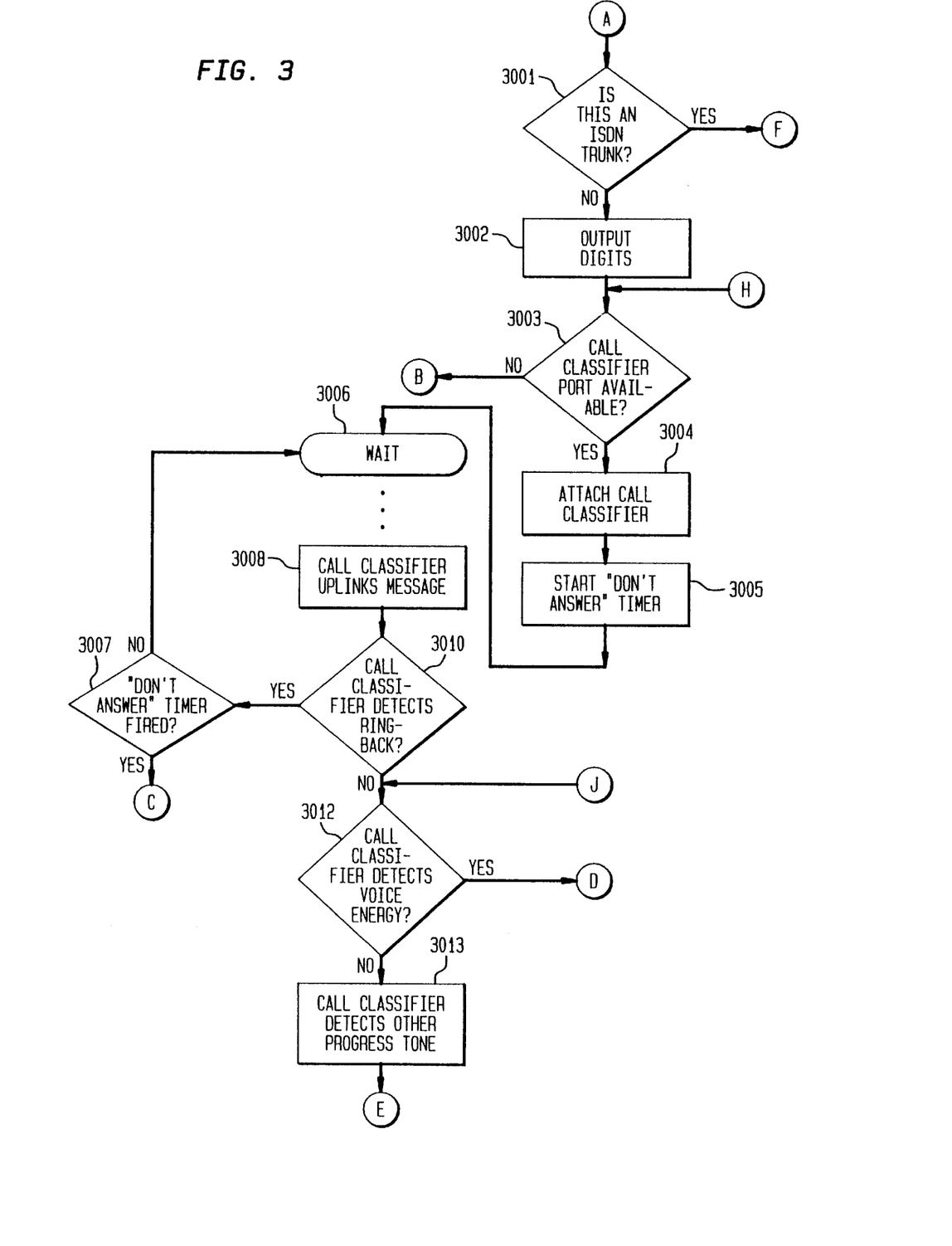

At entry point "A", step 3001, a determination is made whether the off-net trunk seized in step 2003 to the covering switch is an ISDN trunk. If the trunk is an ISDN trunk, processing continues at entry point "F". If the trunk is not an ISDN trunk, the digits of the covering end-point are outpulsed in step 3002 and the principal's switch 10 determines whether a call classifier 77, FIG. 1, is available in step 3003. If a call classifier is not available, processing continues at entry point "B". A call classifier is a device at the first switch 10 which listens to the call progress tones from the far end which appear on the connection and which informs processor 13 of voice energy or progress tones that appears on the connection. If call classifier 77 is available, it is attached to the off-net trunk at step 3004 and a timer is started at step 3005 to mark the time the switch 10 will await an answer. If answer does not occur within a predetermined time, the "don't answer" time, the call will be moved to the next point in the coverage path. During step 3006 the wait interval elapses during which the call classifier may inform processor 13 in step 3008 as to the call progress tones detected: the detection of ringback tone in step 3010, the appearance of voice energy in step 3012, or the detection of some other tone in step 3013. If ringback tone is detected in step 3010 and the "don't answer" timer has not yet expired in step 3007, the wait interval continues. If the wait interval determined by the "don't answer" timer has expired in step 3007, processing continues at entry point "C". However, if voice frequency energy is detected in step 3012, before the "don't answer" timer has expired, processing continues at entry point "D". Otherwise call classifier 77 has detected some other call progress tone at step 3013 and will treat the offnet coverage point as busy at entry point "E".

Figure 4:
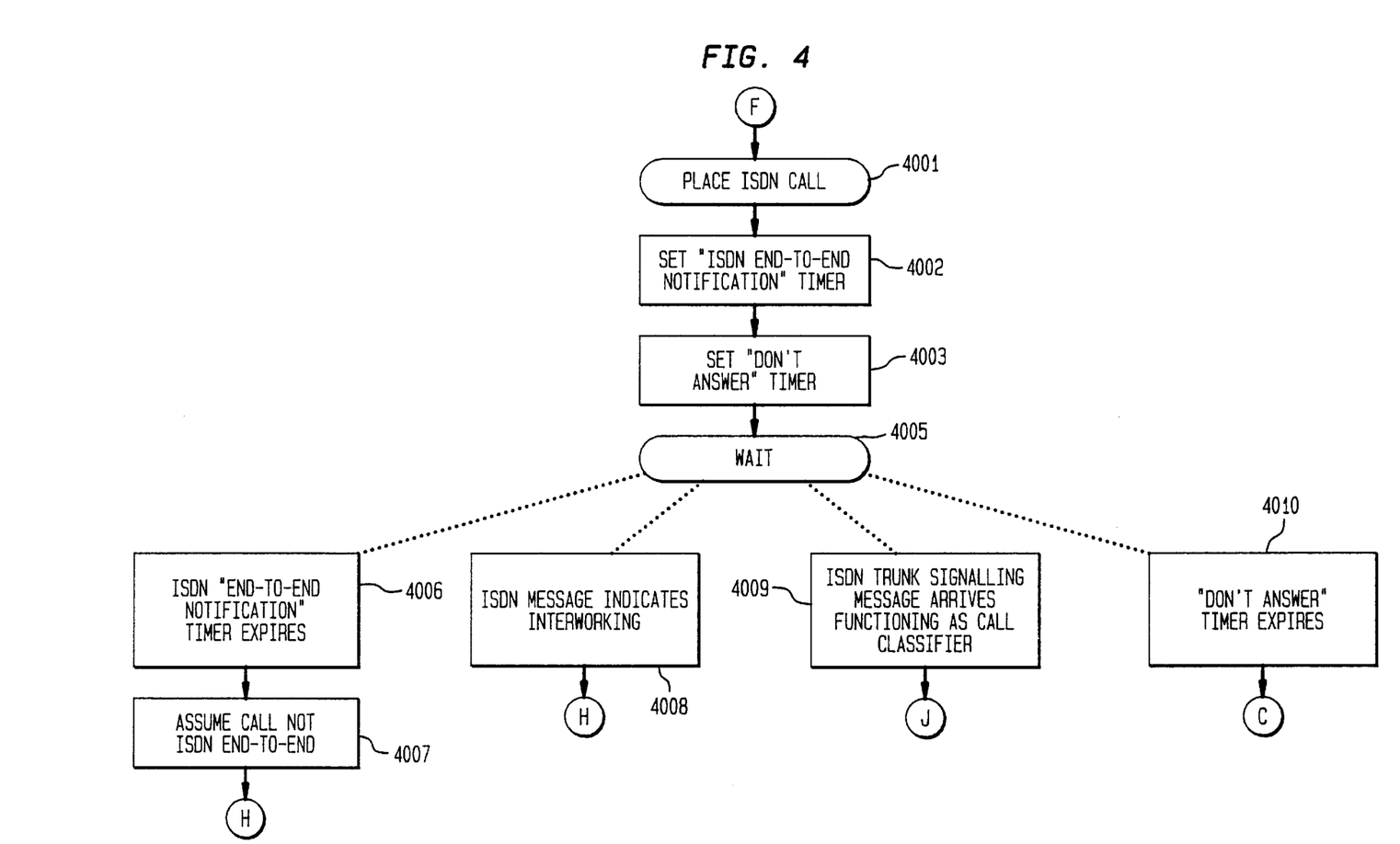

Processing at entry point "F" is reached if the off-net trunk seized in step 2003 is determined to be an ISDN trunk. At step 4001, the call is handled as an ISDN call and at step 4002 a timer is set for the appearance of an "ISDN end-to-end" signal which indicates that the entire path to the covering end-point consists only of ISDN trunks so that ISDN end-to-end signaling is possible. In step 4003 a don't answer timer is set and a wait interval ensues at step 4004. At this point there are four possibilities. The first possibility is considered at step 4006 where the timer set in step 4002 has expired without the ISDN "end-to-end" notification being received so that in step 4007 it is assumed that the call will not be an ISDN "end-to-end" connection and processing continues at entry point "H". The second possibility is that at step 4008 an ISDN message is received that indicates that some non-ISDN trunks are present in the connection to the covering end-point, i.e., an ISDN "interworking" message, so that processing continues at entry point "H" just as if no ISDN end-to-end path were available. The third possibility is considered at step 4009 in which the ISDN message received indicates that there is an ISDN end-to-end connection to the covering endpoint so that ISDN messages can be relied upon to indicate whether the called party is ringing, when the call is answered, if busy tone is encountered, etc. Essentially, upon the receipt of the ISDN end-to-end message at step 4009, ISDN signaling may be relied upon as a call classifier and processing continues at entry point "J", see FIG. 3. The fourth possibility is considered at step 4010 in which the "don't answer" timer expires and processing continues at entry point "C".

Figure 5:
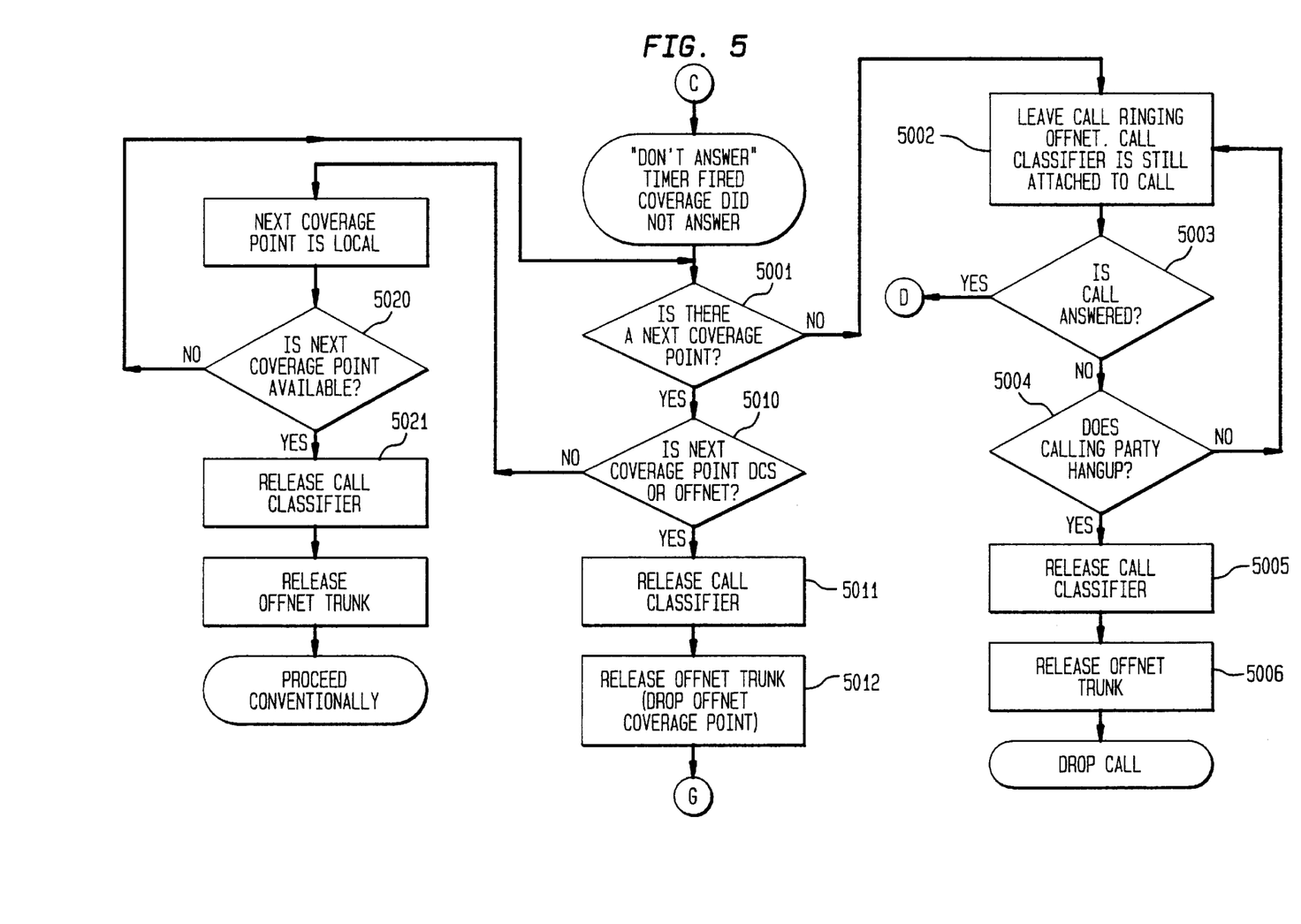

At entry point "C", FIG. 5, is reached when the "don't answer" timer has expired in step 3007, FIG. 3 or step 4010, FIG. 4. At step 5001 a determination is made whether there is a next coverage point for the call. If there is no further coverage point, at step 5002 the call is left ringing at the off-net location while the call classifier is maintained on the call at the first switch. The call classifier continues to monitor the connection awaiting answer at step 5003. If the call classifier detects that the call is answered, processing continues at entry point "D", FIG. 6. If the call is not answered, the call classifier at step 5004 continues to monitor until the calling party hangs up and, at step 5005, the call classifier is released and, at step 5006, the off-net trunk is released and the call is dropped, at step 5008.

If, at step 5001, it had been determined that there was a further coverage point or the call then, at step 5010 a determination is made whether that coverage point is remote. If the coverage point is remote, the call classifier is released at step 5011, the off-net trunk is released at step 5012 and processing continues at entry point "G". If the coverage point is local then, at step 5020, a determination is made whether the next coverage point is available. If not, processing returns to step 5001. If a local coverage point is available then, at step 5021 the call classifier is released, at step 5022 the off-net trunk is released, and processing continues conventionally, at step 5023.

Figure 6:
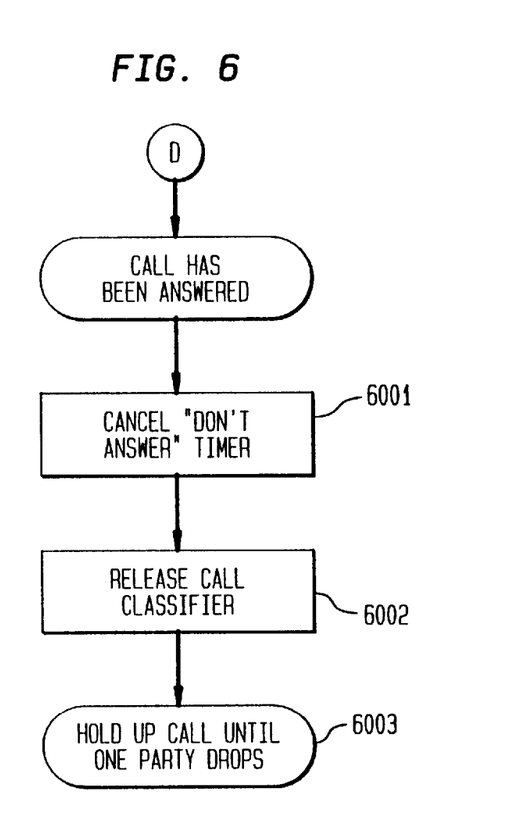

Entry point "D", FIG. 6, is reached when the call has been answered. When the call is answered the principal may still pick up the call since the simulated bridged appearance is maintained. Any single party to the call may drop off after the principal bridges on and the call will still be held. The call will be ended when only a single party remains on the call. At step 6001, the timing for "don't answer" is canceled, the call classifier is released at step 6002 and at step 6003, the call is held until one party hangs up.

Figure 7:
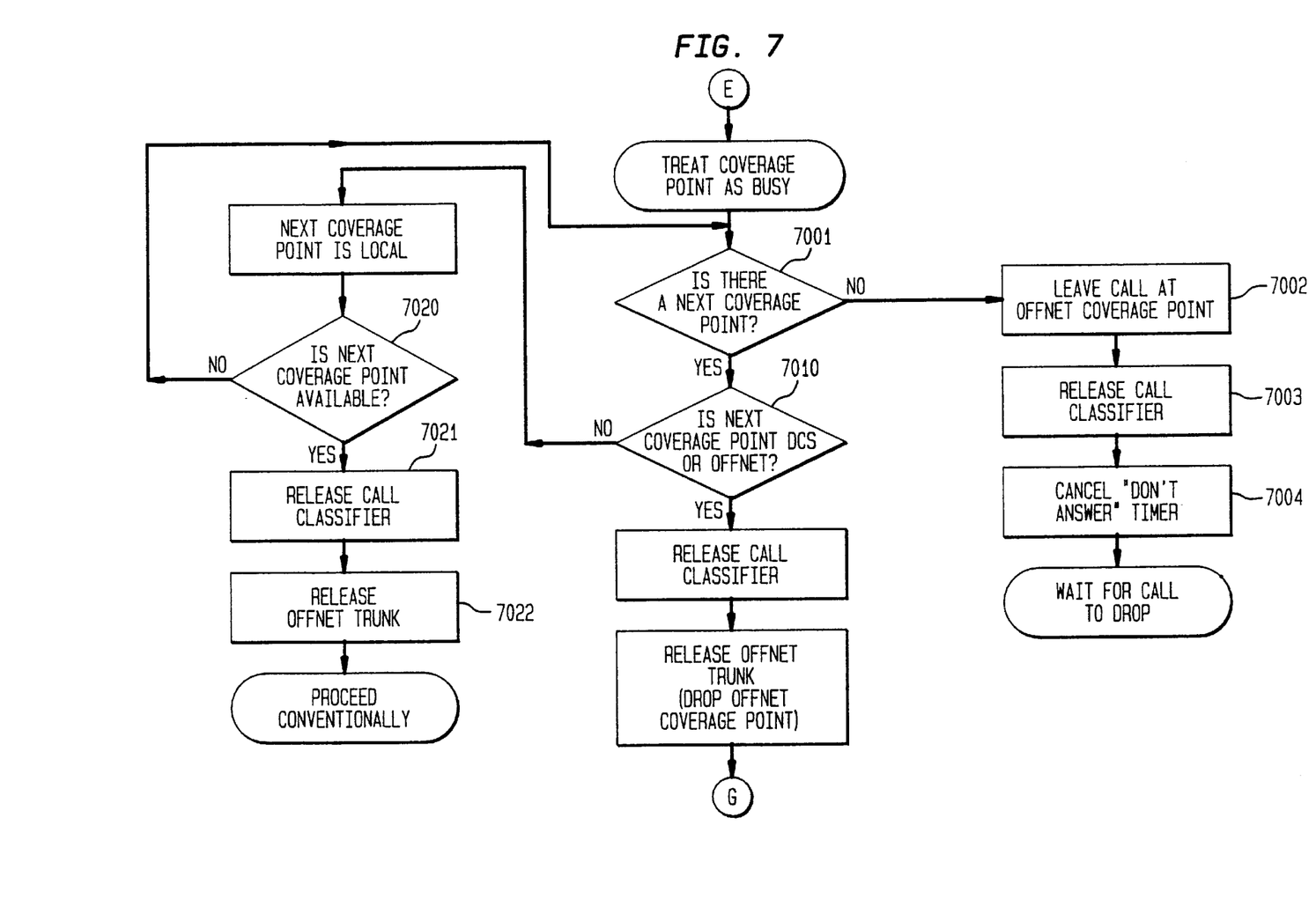

Entry point "E", FIG. 7, is reached from step 3013, FIG. 3, when the call classifier detects a call progress tone other than ringing, which results in treating the call as if the covering point is busy. In step 7001 a determination is made whether there is another coverage point for the call. If there is no further coverage point then, in step 7002, the call is left at the present off-net coverage point, the call classifier is released at step 7003, the "don't answer" timing is canceled at step 7004 and the call is dropped when the calling party hangs up.

In step 7001 if it has been determined that there is a further coverage point for the call, a determination is made in step 7010 whether that point is remote. If the coverage point is remote, the call classifier is released in step 701 1, the off-net trunk is released in step 7012 and processing continues at entry point "G". If, in step 7010, it has been determined that the further coverage point is local, then processing continues to handle the call as for local call redirection. In step 7020 a determination is made whether a local call coverage point available and, if not, processing continues at step 7001 described previously. If a local coverage point is available, the call classifier is released at step 7021, the off-net trunk is released at step 7022 and processing continues as for local call redirection, at step 7023.

Of course, various changes and modifications to the illustrative embodiment described above will be apparent to those skilled in the art. For example, the covered call can be transferred by the covering party to the covered terminal, or the covering party can conference in the covered terminal and then either remain on the call or drop out. Such changes and modifications can be made without departing from the spirit and the scope of the invention and without diminishing its attendant advantages. It is therefore intended that such changes and modifications be covered by the following claims.

What is claimed is:

1. A remote call-redirection method comprising the steps of:
    (a) determining at a first switch, in response to the invocation of call redirection for a call, whether a call-covering end-point for said call is served by a remote switch;
    (b) in response to determining that said end-point is so served, extending the call to the remote switch serving the call-covering end-point;
    (c) determining at said first switch for said extended call whether voice frequency energy appears on said call within a predetermined time interval;
    (d) in response to the appearance of said voice frequency energy within said predetermined interval, completing said call to said call-covering end-point;
    (e) further processing said call at said first switch when said voice frequency energy fails to appear within said predetermined time interval including releasing said remote switch and determining at said first switch whether another coverage point exists for said call.

2. A remote call-redirection method according to claim 1 wherein said continued processing of said call includes determining whether a further call-covering end-point for said call served by a different remote switch exists and repeating steps (c) through (e) for said call through said different remote switch.

3. A remote call-redirection method according to claim 1, wherein during a first interval of said predetermined time interval the continuance of ringback tone is monitored and wherein said remote switch is released when said ringback tone continues beyond said first interval.

4. A remote call-redirection method according to claim 1 wherein said step (c) is performed by connecting a call classifier to the call at said first switch.

5. A remote call-redirection method according to claim 1, comprising:
    determining, incident to said extending of said call to said remote switch in step (b) whether an ISDN trunk is present and, if so, timing for the appearance of an ISDN end-to-end notification;
    in response to the timely receipt of said ISDN end-to-end notification and, in lieu of steps (c) and (d), processing said call in accordance with ISDN trunk signaling messages thereafter received to complete the call to said call-covering end-point when one of said ISDN trunk signaling message indicates called party answer and, in response to others of said ISDN trunk signaling messages, performing step (e).

6. A remote call-redirection method according to claim 5 in response to the non-receipt of said ISDN end-to-end notification within a predetermined interval, performing steps (c) through (e).

7. A method of remotely covering a call in a telecommunications network comprising at least two interconnected switches each serving different end-points, comprising the steps of:
    in response to a first switch invoking call coverage for a call connected to the first switch and destined for a destination end-point served by the first switch, the first switch identifying a call-covering end-point for the call from a coverage path of the destination end-point;
    in response to the first switch identifying a remote call-covering end-point for the call from the coverage path, the first switch connecting the call to a second switch that serves the remote call-covering end-point and monitoring call progress tones provided by the second switch throughout a predetermined time interval;

in response to the first switch detecting voice frequency energy on the connection within said interval allowing said second switch to complete the connection to the call-covering end-point; and in response to the first switch failing to detect said voice frequency energy within said interval, taking down the connection to the second switch and further identifying an alternative call-covering end-point for the call.

8. A remote call-coverage switch, comprising (a) means for determining in response to the invocation of call coverage for a call whether a call-covering end-point for said call is served by a remote switch;

(b) means responsive to said determining that said end-point is so served for extending the call to the remote switch serving the call-covering end-point;

(c) means including a call classifier connectable on said call for determining whether voice frequency energy appears on said call within a predetermined time interval;

(d) means responsive to the appearance of said voice frequency energy within said predetermined interval for completing said call to said call-covering end-point; and (e) means for further processing said call when said voice frequency energy fails to appear within said predetermined time interval.

\* \* \* \* \*